G. A. LUTZ.
OUTLET OR JUNCTION BOX.
APPLICATION FILED FEB. 12, 1908.
916,743.
Patented Mar. 30, 1909.
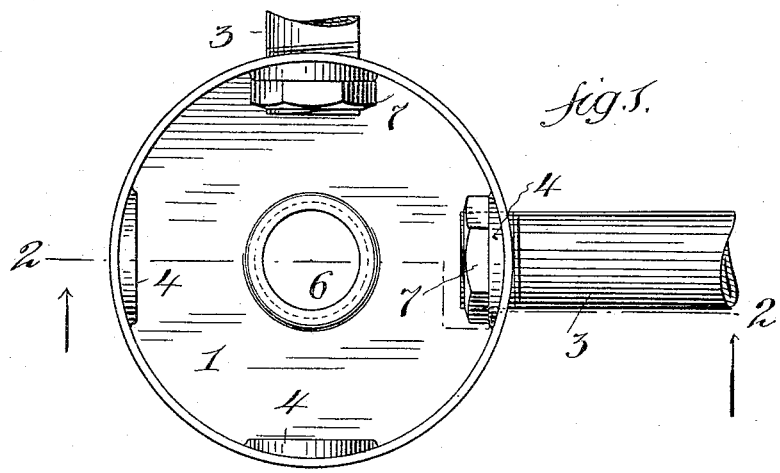
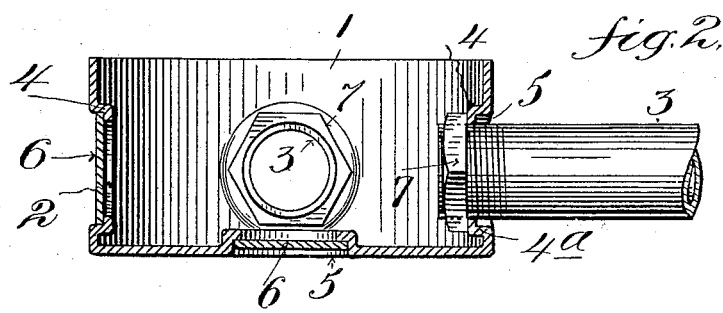
Witnesses:
C. F. Benjamin
Marie J. Wainright
Inventor
George A. Lutz.
By his Attorney
T. F. Bourne

UNITED STATES PATENT OFFICE.

GEORGE A. LUTZ, OF PLAINFIELD, NEW JERSEY, ASSIGNOR TO AMERICAN CIRCULAR LOOM COMPANY, OF PORTLAND, MAINE, A CORPORATION OF MAINE.

OUTLET OR JUNCTION BOX.

No. 916,743.     Specification of Letters Patent.     Patented March 30, 1909.

Application filed February 12, 1908. Serial No. 415,485.

*To all whom it may concern:*

Be it known that I, GEORGE A. LUTZ, a citizen of the United States, and resident of Plainfield, in the county of Union and State of New Jersey, have invented certain new and useful Improvements in Outlet or Junction Boxes, of which the following is a specification.

My invention relates to improvements in outlet or junction boxes for use in connection with conduits or electric conductors, and the object of my invention is to provide improved means for detachably connecting the knockouts or plugs with the outlets or openings of the box, and to provide uniform surfaces to receive the nuts or fastenings that connect the conduits with the box.

In carrying out my invention I provide a suitable box, such as of drawn or cast metal, with depressed or countersunk flanges at the outlets or openings providing seats adjacent such flanges, and knockouts or plugs firmly fitted in such seats to close the outlets or openings, whereby when a conduit is to be attached to the box the knockout or plug may be readily removed to permit the conduit to pass into the outlet or opening. The inner surfaces of said flanges are at a distance or raised from the box walls and may be made substantially flat so that the nut or fastening for the conduit may bear firmly and uniformly against such flange without engaging the wall of the box. This will be found advantageous where the box is circular in shape so that the nut or fastening may have a firm seat.

Reference is to be had to the accompanying drawings forming part hereof, wherein, Figure 1 is a plan view of an outlet or junction box embodying my invention, and Fig. 2 is a cross section substantially on the line 2, 2, in Fig. 1.

The box 1, which may generally be of well known or suitable construction, and which in the drawings is shown in circular form, is provided in one or more of its walls with outlets or openings 2 each adapted to receive a suitable conduit 3 for electric conductors. The outlets or openings 2 are formed within flanges 4 shown located inwardly from the corresponding wall of the box as by being depressed or countersunk, providing seats 5 to receive knockouts or plugs 6. The box with its flanges 4 and seats 5 may be formed by drawing suitable sheet metal in dies to the form desired whereby the flanges 4 will be offset or raised from the corresponding wall of the box as by the bosses 4ᵃ from which the flanges extend, and said flanges will act as interior abutments against which the knockouts or plugs 6 may bear when fitted snugly within the seats 5, to keep the knockouts from falling or being pushed into the box. The conduits 3 pass through the openings 2 and fit within flanges 4, and the nuts 7, which in the drawings are shown adapted to be screwed upon threads on the conduits, bear against the inner faces of the flanges 4, and as the latter are offset from the inner walls of the box, the nuts are free to rotate against the relatively uniform surfaces of the flanges without engaging the walls of the box, thus providing a firm fitting, and also a closure of openings 2.

Instead of making the box and its flanges of drawn sheet metal the same may be made by casting the same of suitable metal with the flanges 4 and seats 5 arranged as set forth.

The knockouts or plugs 6 will preferably be of such dimensions with respect to seats 5 as to be forced into the latter and to remain in position by frictional engagement with such seats, and yet said knockouts may be readily removed by striking them through the openings 2 from within the box to push them outwardly.

Having now described my invention what I claim is:

1. An outlet or junction box having flanges surrounding outlets or openings and offset from the walls of the box and located within the box providing seats adjacent the flanges, unobstructed on their outer sides, and knockouts detachably fitted in said seats.

2. An outlet or junction box having integral internal flanges offset inwardly from the inner walls thereof and surrounding the outlets thereof providing seats without the flanges, and knockouts detachably secured in said seats.

3. An outlet or junction box having flanges surrounding the outlets and extending from integral bosses projecting inwardly from the walls of the box and seats for knockouts adjacent said flanges, and knockouts located in said seats.

4. An outlet box made of sheet metal having flanges drawn inwardly within the box from its walls providing outlets and seats adjacent said flanges, said seats being of greater diameter than the outlets, and unobstructed on their outer sides and knockouts secured in said seats without said flanges.

5. An outlet or junction box having flanges surrounding outlets or openings and offset from the walls of the box, combined with pipes passing through said openings, and nuts screwed on the pipes within the box and bearing against the inner faces of said flanges.

6. An outlet or junction box having flanges surrounding outlets or openings and offset from the walls of the box, the inner faces of said flanges being uniform and flat, combined with pipes passing through said openings and having threads within the box, and nuts fitting on said pipes within the box and bearing upon said faces of said flanges.

Signed at New York city, in the county of New York, and State of New York, this 10th day of February, A. D. 1908.

GEORGE A. LUTZ.

Witnesses:
 T. F. BOURNE,
 MARIE F. WAINRIGHT.